United States Patent [19]

Akao

[11] Patent Number: 5,275,283
[45] Date of Patent: Jan. 4, 1994

[54] CONTAINER FOR LIGHT-SENSITIVE STRIP MATERIALS HAVING IMPROVED LIGHT SEALING MEANS

[75] Inventor: Mutsuo Akao, Kanagawa, Japan
[73] Assignee: Fuji Photo Film Co., Ltd., Minami-Ashigara, Japan
[21] Appl. No.: 579,281
[22] Filed: Sep. 6, 1990

Related U.S. Application Data

[63] Continuation of Ser. No. 337,745, Apr. 13, 1989, abandoned, which is a continuation of Ser. No. 86,740, Aug. 19, 1987, abandoned.

[30] Foreign Application Priority Data

Aug. 19, 1986 [JP] Japan .................. 61-193750
Nov. 13, 1986 [JP] Japan .................. 61-268638

[51] Int. Cl.$^5$ .................. B65D 85/67; B65H 16/06
[52] U.S. Cl. .................. 206/409; 206/414; 242/71.1; 242/71.7; 354/275; 428/36.2
[58] Field of Search .................. 206/316, 409, 414; 242/71.1, 71.7; 354/203, 211, 275, 277, 288; 428/35, 220, 516, 518

[56] References Cited

U.S. PATENT DOCUMENTS

| | | |
|---|---|---|
| 4,147,291 | 4/1979 | Akao et al. . |
| 4,212,389 | 7/1980 | Robbins .................. 206/316 |
| 4,258,848 | 3/1981 | Akao et al. . |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. . |
| 4,386,124 | 5/1983 | Akao . |
| 4,411,943 | 10/1983 | Akao . |
| 4,411,945 | 10/1983 | Akao et al. . |
| 4,436,809 | 3/1984 | Akao et al. . |
| 4,452,846 | 6/1984 | Akao . |
| 4,469,741 | 9/1984 | Akao . |
| 4,513,050 | 4/1985 | Akao . |
| 4,565,733 | 1/1986 | Akao . |
| 4,565,743 | 1/1986 | Akao . |
| 4,568,590 | 2/1986 | Iwai .................. 206/316 X |
| 4,576,865 | 3/1986 | Akao . |
| 4,579,781 | 1/1986 | Akao . |
| 4,584,234 | 4/1986 | Hirose et al. . |
| 4,587,175 | 5/1986 | Akao .................. 428/596 |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,701,359 | 10/1987 | Akao .................. 428/35 |
| 4,730,778 | 3/1988 | Akao et al. .................. 206/409 X |

FOREIGN PATENT DOCUMENTS

| | | |
|---|---|---|
| 56-16608 | 4/1981 | Japan . |
| 59-36736 | 9/1984 | Japan . |
| 60-156058 | 8/1985 | Japan . |
| 1063226 | 3/1967 | United Kingdom .................. 206/316 |

*Primary Examiner*—Bryon P. Gehman
*Attorney, Agent, or Firm*—Burns, Doane, Swecker & Mathis

[57] ABSTRACT

In a container for a roll of a light-sensitive strip material having a core on which the light-sensitive strip material is coiled to form a roll, an opening for drawing out the light-sensitive strip material and a teremp cloth provided on the above opening for shielding from light, wherein a filling layer formed of polyolefin copolymer resin usable as the adhesive layer for fixing the teremp cloth on the container body is provided at the ground fabric of the teremp cloth, and/or a multilayer coextruded film is laminated under the ground fabric of the teremp cloth, and the multilayer coextruded film has a tensile strength of more than 500 g/15 mm width and comprises an adhesive layer of an ethylene copolymer resin having a comonomer content of 5 to 36 % for fixing said teremp cloth on the container body and a thermoplastic resin base layer having a melting point of higher than the ethylene copolymer resin adhesive layer by 10° C. or more and a Young's modulus of more than 15 kg/mm$^2$.

In this container, the filling material does not so deeply permeate into pile yarns, even though the ground fabric is not so dense. Adhesion of pile yarn dust hardly occurs, and troubles in exposure and development caused by the pile yarn dust are solved. By incorporating the multilayer coextruded film, the thickness of the adhesive layer for fixing teremp cloth on the container body is made uniform and various problems caused by non-uniformity in the thickness of the adhesive layer are solved.

9 Claims, 4 Drawing Sheets

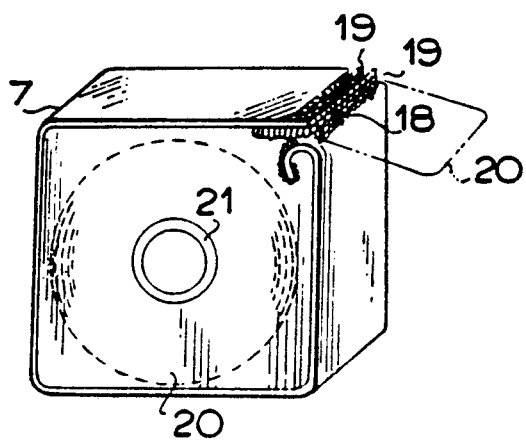
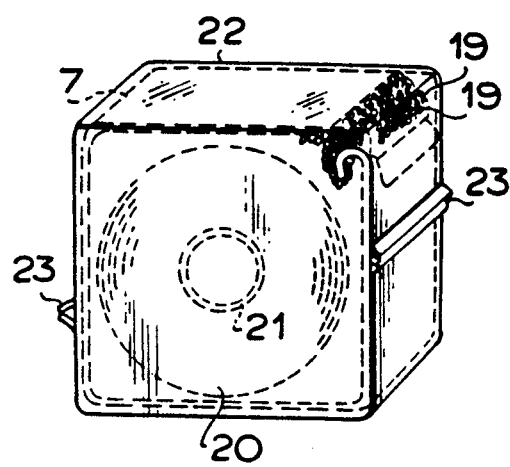
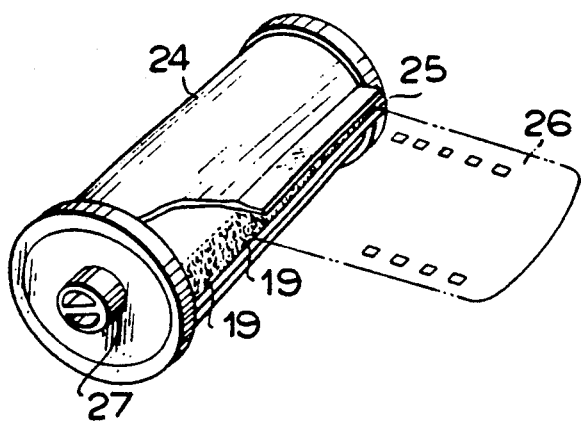

CONTAINER FOR LIGHT-SENSITIVE STRIP MATERIALS HAVING IMPROVED LIGHT SEALING MEANS

This application is a continuation of application Ser. No. 337,745, filed Apr. 13, 1989 now abandoned.

BACKGROUND OF THE INVENTION

1. Field of the Invention

This invention relates to a container for a roll of a light-sensitive strip material such as a photographic roll film or a roll of photographic paper. More particularly, this invention relates to a lightproof container having an opening for drawing out the light-sensitive strip material where teremp cloth is provided.

2. Description of Prior Art

As the container for a roll of a light-sensitive strip material, various types have been disclosed in U.S. Pat. No. 4,148,395, U.S. Pat. No. 4,179,028, U.S. Pat. No. 4,239,164, U.S. Pat. No. 4,272,035, U.S. Pat. No. 4,291,802, U.S. Pat. No. 4,398,814, U.S. Pat. No. 4,403,845, Japanese Patent KOKAI No. 60-156058, Japanese Patent KOKOKU No. 59-36736 and Japanese Utility Model KOKOKU No. 56-16608.

Generally, a light-shielding member is provided at the drawing out part of a container for a light-sensitive strip material in order to prevent the inner light-sensitive strip material from being exposed to the light leaked from the drawing out part. Various light-shielding members are known, and among these, the light-shielding members mainly composed of cloth are called teremp cloth.

An example of conventional teremp cloth disclosed in Japanese Utility Model KOKOKU No. 46-20539 is shown in FIG. 19. This teremp cloth was composed of a woven ground fabric 1 and coreless pile yarn 4 woven thereinto. The ground fabric 1 was formed by weaving the warp 2 and the woof 3 like shown in FIG. 20. The above coreless pile yarn was formed from a soft raw yarn such as viscose yarn or acetate yarn by crimp processing, and the ground fabric 1 was impregnated with an adhesive material 5 for filling in order to fix the pile yarn 4. Generally, such a teremp cloth was manufactured first by weaving the warp 2 and the woof 3 together with entangling pile warp yarn 4 therein to form double velvet and then by cutting the loop.

However, in the case of the conventional teremp cloth as shown in FIG. 19, fraying or falling out of pile yarn occurs during the manufacture of the teremp cloth and drawing out or in the light-sensitive strip material. Dust from the pile yarn adheres to the surface of the light-sensitive material, and causes trouble in exposure and development. In addition, it is necessary to arrange the orientation of pile yarn so as to prevent meander movement of the light-sensitive material during its drawing out. It is also a problem that its manufacture process is complicated and manufacturing cost is expensive. Particularly, in the case of the container for a roll of photographic color printing paper capable of loading in a light room, adhesion of pile yarn dust is a serious problem under high temperature and high humidity conditions because of increasing adhesion of the gelatin layer.

A filling material solution was impregnated into the ground fabric 1, and dried to form a filling layer 5 which fixed the pile yarn 4 to the ground fabric 1. A heat-sealable adhesive layer 6 was coated on the filling layer 5, and the teremp cloth was stuck on the drawing out opening of container body 7.

In such a conventional teremp cloth, the weaving yarn of ground fabric must be thickened in order not to impregnate the filling material solution deeply into the pile yarn in the coating process of the filling material solution. As a result, a velvet cloth made of a large quantity of yarn was employed as the teremp cloth, though it was expensive. Besides, the thickness of the adhesive layer 6 varied according to the irregularity of the ground fabric, impregnation rate of adhesive, ununiformity in weaving yarn arrangement of the ground fabric or the like, and various problems occurred caused by the variation of the adhesive layer thickness, such as unstable adhesive strength to container body 7, significant non-uniformity in light-shielding in the case of an adhesive containing a light-shielding material, generation of furrows on ground fabric 1, wrinkling and the like. In the case of coating a hot-melt adhesive layer, similar problems occurred.

SUMMARY OF THE INVENTION

An object of the invention is to provide a container for a roll of a light-sensitive strip material wherein the pile yarn of teremp cloth is not so deeply impregnated with a filling material solution, even though the ground fabric is not so dense.

Another object of the invention is to provide a container for a roll of a light-sensitive strip material not giving rise to troubles in exposure and development caused by adhesion of pile yarn dust.

Another object of the invention is to provide a container for a roll of a light-sensitive strip material using a teremp cloth wherein the thickness of the adhesive layer for fixing teremp cloth on the container body is made uniform and various problems caused by non-uniformity in the thickness of the adhesive layer are solved.

Such objects can be achieved by coating the molten resin of polyolefin copolymer on the ground fabric of teremp cloth to form a filling layer usable as the adhesive layer to attach the teremp cloth to the container body and/or by laminating a multilayer coextruded film comprising an ethylene copolymer resin adhesive layer for fixing the teremp cloth on the container body and a thermoplastic resin base layer. The multilayer coextruded film greatly contributes to the improvement in the uniformity of the adhesive layer.

Thus, the present invention provides a container for a roll of a light-sensitive strip material having a core on which said light-sensitive strip material is coiled to form a roll, an opening for drawing out said light-sensitive strip material and a teremp cloth provided on said opening for shielding the light-sensitive material from light, wherein a filling layer formed of polyolefin copolymer resin usable as the adhesive layer for fixing said teremp cloth on the container body is provided at the ground fabric of said teremp cloth.

The present invention also provides a container for a roll of a light-sensitive strip material having a core on which said light-sensitive strip material is coiled to form a roll, on opening for drawing out said light-sensitive strip material and a teremp cloth provided on said opening for shielding from light, wherein a multilayer coextruded film is laminated under the ground fabric of said teremp cloth, and said multilayer coextruded film has a tensile strength of more than 500 g/15 mm width and comprises an adhesive layer of an ethylene copolymer resin having a comonomer content of 5 to 36% for fixing said teremp cloth on the container body and a thermoplastic resin base layer having a melting point higher than said ethylene copolymer resin adhesive layer by 10° C. or more and a Young's modulus of more than 15 kg/mm$^2$.

BRIEF DESCRIPTION OF THE DRAWINGS

FIGS. 15 to 18 are perspective views of containers embodying the invention.

DETAILED DESCRIPTION OF THE INVENTION

Figure 1:
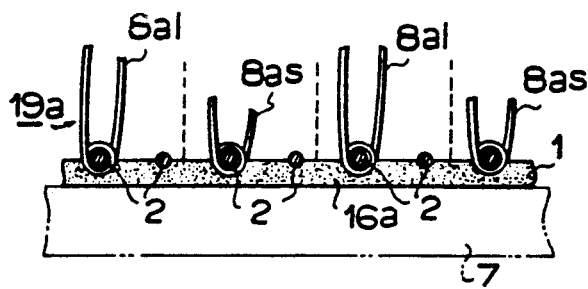
FIGS. 1 to 14 are schematically illustrated sectional views of teremp cloths attached to the container body according to the invention.

The polyolefin copolymer resin for the filling layer has a strong adhesive force to a ground fabric and it can fix pile yarns to the ground fabric. It can adhere teremp cloth on the drawing out opening of a container body by reactivating the resin by means of a heat-sealing method or an ultrasonic heating method, and it has a viscosity so as not to impregnate into pile yarns up to the vicinity of their tips at the time of coating. It is also necessary for the polyolefin copolymer resin not to adversely affect the light-sensitive material. Such a polyolefin copolymer resin may be selected from various thermoplastic polyolefin copolymer resins, and a particularly preferable resin is ethylene-ethylacrylate (EEA) resin having an ethylacrylate content of more than 6% by weight measured by NUC test method. This EEA resin is excellent in coloring, heat stability, melt extrusion coating, adhesion to paper, metal and thermoplastic resin, and homogeneous blending with carbon black and other thermoplastic resins. Representative manufacturers of the EEA resin are UNION CARBIDE, NIPPON UNICAR, MITSUBISHI PETROCHEMICAL, SUMITOMO CHEMICAL, MITSUI POLYCHEMICALS, etc.

Light-shielding material such as carbon black, metal powder or aluminum paste may be blended with the polyolefin copolymer resin in order to prevent entry of light through the filling layer. Antistatic agent may also be blended in order to prevent static electrification caused by the friction between the light-sensitive strip material and the teremp cloth.

The thickness of the filling layer is usually 15 to 150 μm, preferably 20 to 100 μm.

The filling layer may be formed by various coating methods, however, extrusion coating is preferable because of small neck-in, strong adhesive force to ground fabric, good separability from the chill roll and easy and inexpensive production.

The teremp cloth may directly be attached to the drawing out opening of the container body using the filling layer as the adhesive layer. However, it is preferably attached through the multilayer coextruded film. In the latter case, the filling layer may also be a conventional one.

The ethylene copolymer resin adhesive layer is incorporated in order to adhere the ground fabric of teremp cloth to the container body made of paper, plastic, metal or the like. In view of a balance between heat-sealability and blocking, preferable resins for this layer are EEA resin, ethylene-methylacrylate copolymer (EMA) resin, ethylene-vinylacetate copolymer (EVA) resin, ethylene-acrylic acid copolymer (EAA) resin and ethylene methacrylic acid copolymer (EMAA) resin. The comonomer content of the copolymer resin is 5 to 36%. When the comonomer content is less than 5%, heat sealing to the container body made of paper, plastic or metal becomes difficult. While, when the comonomer content is beyond 36%, blocking occurs.

In order to secure light-shielding or antistatic property, light-shielding material or conductive light-shielding material is preferably blended into the copolymer resin layer. For example, blending 0.1 to 20% by weight of carbon black is particularly preferable.

The thickness of the ethylene copolymer resin layer is usually 5 to 145 μm, and 15 to 80 μm is preferable.

The thermoplastic resin base layer is incorporated in order to prevent wrinkling or furrowing, to secure tensile strength, to prevent curling, to prevent unevenness in thickness and the like, at the molding of the multilayer coextruded film and at the laminating on the ground fabric. The melting point of the thermoplastic resin base layer is higher than the foregoing ethylene copolymer resin layer by 10° C. or more. The multilayer coextruded film is first laminated under the teremp cloth, and cut into a prescribed size. This teremp cloth is heat-sealed on the drawing out opening of the container body. At that time, if the melting point is not higher the copolymer resin layer by 10° C., the teremp cloth is separated by layer separation. Additionally, Young's modulus of the thermoplastic resin layer is more than 15 kg/mm$^2$. In the cast that the Young's modulus is less than 15 kg/mm$^2$, wrinkling, furrowing and elongation occur caused by tension added during laminating the multilayer coextruded film on the teremp cloth, and thereby film thickness and light-shielding of the multilayer coextruded film become uneven. Examples of the thermoplastic resins suitable for such a base layer are various polyolefin resins, particularly polyethylenes such as low-density polyethylene (LDPE), low-pressure linear low-density polyethylene (L-LDPE), medium-density polyethylene (MDPE) and high-density polyethylene (HDPE), polypropylenes, and blended resins containing more than 50% by weight of the above polyethylene or polypropylene. 0.3 to 15% by weight of carbon black is preferably blended into the thermoplastic resin. The above polyethylenes and polypropylenes containing the above amount of carbon black are excellent in film moldability, prevention of blocking, Young's modulus of film, prevention of winkling at lamination, less deterioration of film surface, and the like. The thickness of the thermoplastic resin base layer is usually 5 to 145 μm, preferably 15 to 80 μm.

The multilayer coextruded film may be composed of three or more layers. In this case, the extra layer may be the same or a different ethylene copolymer resin layer, the same or a different ethylene copolymer resin layer, the same or a different thermoplastic resin base layer, or another intermediate layer capable of being coextruded. The total thickness of the multilayer coextruded film is usually 30 to 150 μm, and the total content of light-shielding material is preferably 0.3 to 30 g/m$^2$. The tensile strength of this multilayer coextruded film is more than 500 g/15 mm width. When the tensile strength is less than 500 g/15 mm width, this film becomes liable to be broken, winkled or furrowed at the time of laminating on the teremp cloth.

Adhesion of the multilayer coextruded film on the ground fabric or teremp cloth may be carried out by any known method, however, wet lamination, dry lamination and extrusion laminating are preferable in view of securing the softness of teremp cloth and efficient production.

The fiber forming the teremp cloth is not limited, however, polyester fiber and polyamide fiber are preferable because of low hygroscopicity and good restoration. Moreover, they can be cut by fuging such as heat-slitting or supersonic-slitting without forming fray at the cut position. Heat setting after raising is acceptable, and their physical strengths are large. The teremp cloth is preferably knitted fabric because of less falling out of yarns. Examples of preferred teremp cloth are raising knit (pile knit), wet knitted fabrics, such as tubular knitted fabric and plain stitch fabric, raised to form looped piles, warp knitted fabrics, such as tricot fabric, raschel fabric including double raschel fabric and milanese fabric, raised to form looped piles, and sinker pile fabric having looped piles manufactured by using a circular knitting machine.

In the case of utilizing the foregoing filling layer as the adhesive layer, the filling layer is reactivated (melted) by known method such as using supersonic waves or high-frequency waves, and the teremp cloth is then stuck on the container body. An adhesive layer may be coated on the filling layer, and teremp cloth is stuck on the container body through this adhesive layer. In the case that the foregoing multilayer coextruded film is laminated, the ethylene copolymer resin adhesive layer is utilized as the adhesive layer. This adhesive layer is reactivated in a similar manner as above, and then stuck on the container body.

The light-sensitive strip material placed in the container of the invention is not limited, and includes color photographic printing paper, printing paper for computerized type-setting system, photoresist, microfilm for computer and JIS 135-type photographic film. The container to which the present invention can be applied is any of known container admitting a roll of the above light-sensitive strip materials coiled around a core and a drawing out the light-sensitive strip material from drawing out opening. Examples of such a container are various light-shielding containers for microfilm for computer, for printing paper for computerized type-setting system, and for color photographic printing paper, and JIS 135-type photographic film cartridge.

EXAMPLES

EXAMPLES 1 to 6

Examples of the container provided with the filling layer are illustrated in FIGS. 1 to 6.

The light-shielding teremp cloth 19a shown in FIG. 1 is composed of a ground knitted fabric 1 and long fluffed pile yarns 8al and short fluffed pile yarns 8as alternately wound around warp yarns 2 of the ground fabric 1. The light-shielding filling layer 16a is composed of EEA resin and light-shielding material blended thereinto, and formed by melt coating on the ground fabric 1. The teremp cloth 19a is directly attached to on the container body 7 using the filling layer 16a as the adhesive layer.

Figure 2:
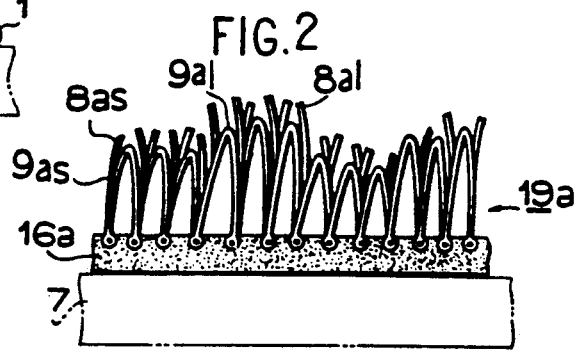

In the light-shielding teremp cloth 19a shown in FIG. 2, long fluffed piles 8al, short fluffed piles 8as, long looped piles 9al and short looped piles 9as are formed.

The filling layer 16a is the same as employed in the example of FIG. 1.

Figure 3:
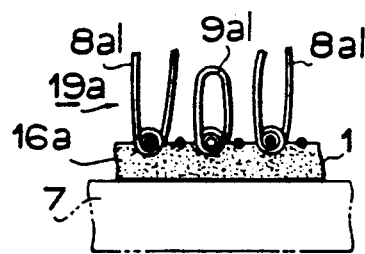

The light-shielding teremp cloth 19a of FIG. 3 is the same as the teremp cloth 19a of FIG. 1, except that long looped piles 9al are formed instead of short fluffed piles 8as. The filling layer 16a is the same as employed in FIG. 1.

Figure 4:
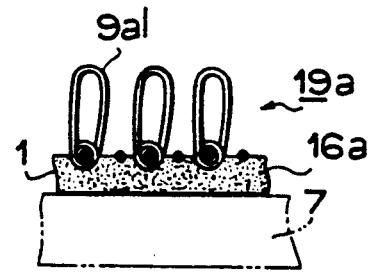

Piles of the light-shielding teremp cloth 19a of FIG. 4 are all long looped piles 9al. The filling layer 16a is the same as employed in FIG. 1.

Figure 5:
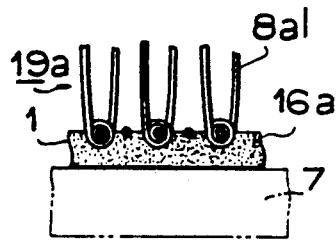

Piles of the light-shielding teremp cloth 19a of FIG. 5 are all long fluffed piles 8al. The filling layer 16a is the same as employed in FIG. 1.

Figure 6:
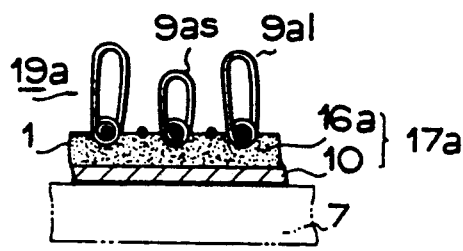

In the light-shielding teremp cloth 19a of FIG. 6, long looped piles 9al and short looped piles 9as are alternately formed. A light-shielding filling layer 16b and an adhesive layer 10 are coextruded on the ground fabric 1, and the ground fabric 1 is stuck on the container body 7 through the adhesive layer 10 of coextruded layer 17a. The filling layer 16a is composed of thermoplastic resin and light-shielding material blended thereinto, and the adhesive layer 10 is composed of EEA resin.

FIGS. 15 to 18 show the examples of the containers into which any of the above teremp cloth structure is incorporated.

The light-shielding container of FIG. 15 is used for a photographic color printing paper or a printing paper for computerized type-setting system. The container body 7 is box-shaped, and made of metal, plastic resin or paper. A drawing out opening (port) 18 is provided at one corner side, and the teremp cloth 19 was stuck on both inner faces being opposite to each other. Core 21 of the roll of the light-sensitive strip material 20 is provided at the center of the container.

Another example of the container is shown in FIG. 16. This container is a modification of the above container, and protection of the light-sensitive material and moisture-proofness (and light-shielding) are improved by wrapping with a moistureproof film 22 to seal it. 23 indicates its heat-sealing portion. This moistureproof film is a laminated film composed of an aluminum-metallized thermoplastic resin film layer and a heat-sealing layer or an inflation film of a thermoplastic resin. The moistureproof film may be imparted with light-shielding property.

Another example of the container is shown in FIG. 17. This container is JIS 135-type film cartridge. A drawing out opening 25 is provided at the cylindrical face of the cartridge body 24 in its longitudinal direction, and the teremp cloth 19 was stuck on both inner faces being opposite to each other. 27 indicates core (spool) of JIS 135-type film 26.

Figure 18:
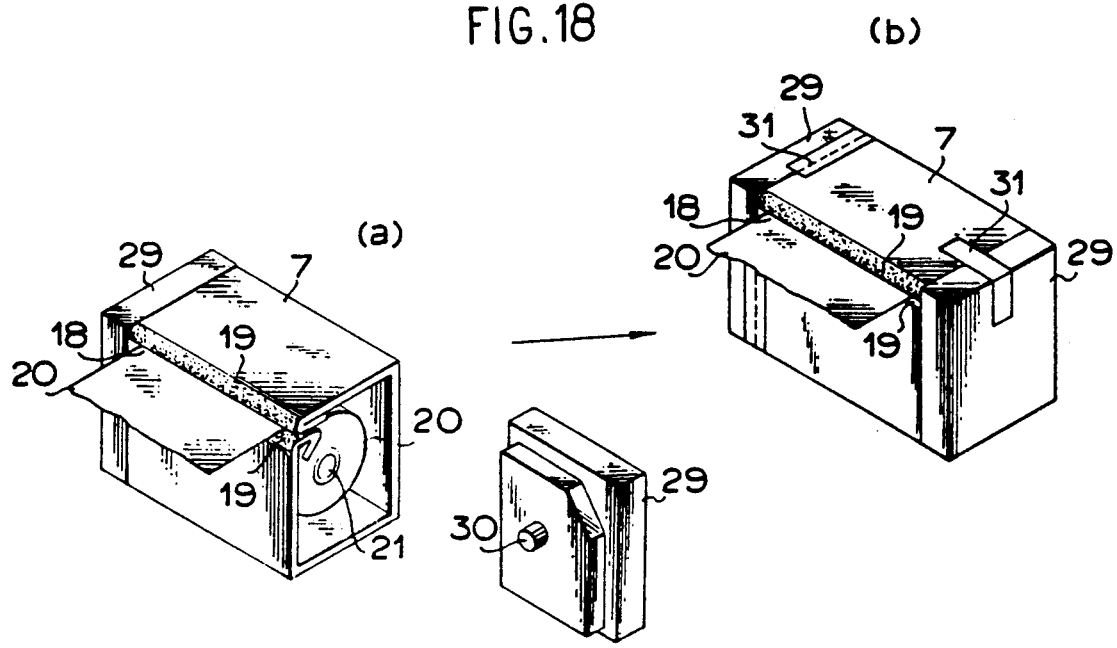

Still another example of the container is shown in FIG. 18. This container is a simplified light-shielding container, and it is composed of a container body 7 and two side panels 29. A short axis 30 projects from slightly upper position of the center of each panel 29, and it supports the core 21 of light-sensitive strip material 20. The side panels 29 are fixed by sealing tape 31 as shown on the left side of the assembled box (b) or on the right side thereof.

Various properties of the containers of the invention were measured and compared with those of a comparative container and a conventional container. The results are shown in Table 1.

TABLE 1

| | Invention 1 | Invention 2 | Comparative | Conventional | Testing Method |
|---|---|---|---|---|---|
| Structure of Teremp Cloth | Tricot Knitting | Double Pile Knitting | Tricot Knitting | Velvet Weaving | |
| Ground Fabric Yarn | 50 Deniers Polyester Yarn | 50 Deniers Nylon Yarn | 50 Deniers Polyester Yarn | 150 Deniers Rayon Yarn | |
| Pile Yarn | 50 Deniers Polyester Yarn | 75 Deniers Nylon Yarn | 50 Deniers Polyester Yarn | 75 Deniers Rayon Yarn | |
| Form Fluffed of Pile Looped | 35% 65% | 100% 0% | 35% 65% | 100% 0% | |
| Pile Length (mm) | 1.1 | 1.1 | 1.1 | 1.1 | |
| Filling Layer (Thickness) | Melt Coating of EEA resin *1 30 um | Melt Coating of EEA resin *2 30 um | Solution Coating | Solution Coating | |
| Adhesive Layer | — | — | Solution Coating | Solution Coating | |
| Fray at Cut Position | A | A | B | D | I |
| Pile Cutting Dust | A | B | B | C | I |
| Falling Out of Piles | A | A | B | D | I |
| Exudation of Filling Material | B | B | E | C | II |
| Cost Ratio | 28 | 30 | 56 | 100 | III |

*1 Ethylacrylate Content 18% "NUC-6170" (NIPPON UNICAR)
*2 Ethylacrylate Content 22% "MB-830" (NIPPON UNICAR)
Evaluations are as follows:
A: very excellent
B: excellent
C: practical
D: having a problem
E: impractical Testing methods are as follows:

I: A photographic color printing paper was placed in each exemplified container, and the container was allowed to stand at 30° C. under 80% RH for 12 hours. Then, the color printing paper was drawn out, and a fray at the cut position, pile cutting dust and falling out of piles were estimated by adhered dusts on the face of the color printing paper.

II. Each filling layer was coated of the ground fabric of each teremp cloth, and after 24 hours, exudation of the filling material was estimated by touch sense and observation of the pile portion.

III: Cost of the conventional teremp cloth was set as 100.

EXAMPLES 7 to 14

Examples of the container provided with the multilayer coextruded film are illustrated in FIGS. 7 to 14.

Figure 7:
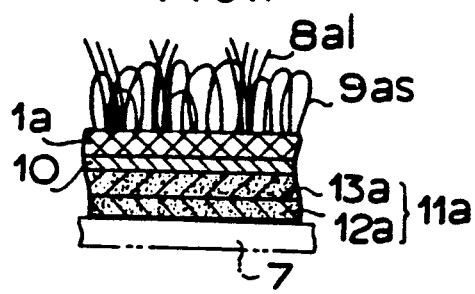

In the light-shielding teremp cloth of FIG. 7, long fluffed piles 8al and short looped piles 9as are randomly formed on the ground fabric 1a of knitting structure, and a multilayer coextruded film 11a is laminated on the ground fabric 1a through an adhesive layer 10. This multilayer coextruded film 11a is composed of an ethylene copolymer resin adhesive layer 12a containing light-shielding material and a thermoplastic resin base layer 13a containing light-shielding material.

Figure 8:
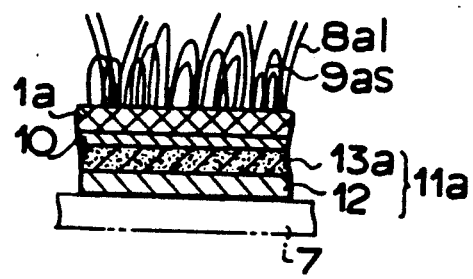

The structure of teremp cloth portion illustrated in FIG. 8 is the same as illustrated in FIG. 7, except that the ethylene copolymer resin adhesive layer 12 does not contain light-shielding material.

Figure 9:
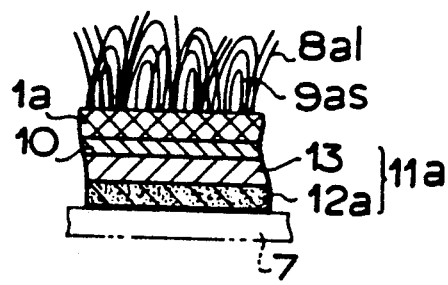

The structure of teremp cloth portion illustrated in FIG. 9 is the same as illustrated in FIG. 7, except that the thermoplastic resin base layer 13 does not contain light-shielding material.

Figure 10:
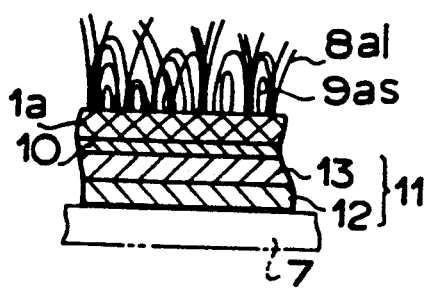

The structure of teremp cloth portion illustrated in FIG. 10 is the same as illustrated in FIG. 7, except that both of the ethylene copolymer resin adhesive layer 12 and the thermoplastic resin base layer 13 do not contain light-shielding material.

Figure 11:
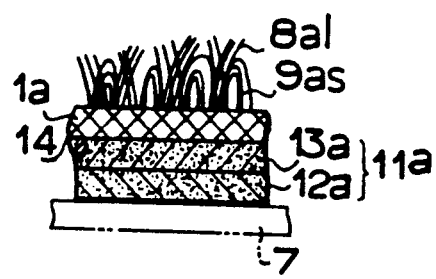

The structure of teremp cloth portion illustrated in FIG. 11 is the same as illustrated in FIG. 7, except that the multilayer coextruded film 11a is directly laminated on the ground fabric 1a through a boundary layer 14 formed by heating.

Figure 12:
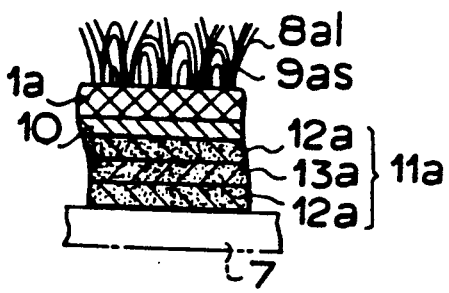

The structure of teremp cloth portion illustrated in FIG. 12 is the same as illustrated in FIG. 7, except that the multilayer coextruded film 11a is composed of a central thermoplastic resin base layer 13a and two ethylene copolymer resin adhesive layers 12a, as a located on both sides thereof.

Figure 13:
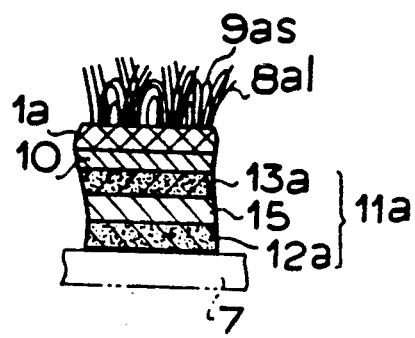

The structure of teremp cloth portion illustrated in FIG. 13 is the same as illustrated in FIG. 7, except that an intermediate layer 15 is incorporated into the multilayer coextruded film 11a.

Figure 14:
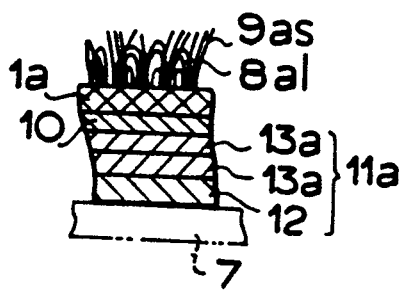

The structure of teremp cloth portion illustrated in FIG. 14 is the same as illustrated in FIG. 8, except that one more thermoplastic resin base layer 13a is incorporated into the multilayer coextruded film 11a.

Various properties of the containers of the invention were measured and compared with those of a comparative container and a conventional container.

In the container I of the invention, the configuration shown in FIG. 7 was employed. The ground fabric 1a was tricot knitting structure, and its yarn was 50 deniers polyester yarn. The pile yarn was also 50 deniers polyester yarn, and the piles was composed of 30% of fluffed piles and 70% of looped piles. The adhesive layer 10 was composed of EEA resin ("NUC-6170", NIPPON UNICAR), and its thickness was 20 μm. The thermoplastic resin base layer 13a was composed of HDPE resin ("HIZEX 3300F", MITSUI PETROCHEMICAL INDUSTRIES) and 3% of carbon black was blended thereinto, and its thickness was 30 μm. Melting point of the HDPE resin was 131° C., and its Young's modulus was 125 kg/mm². The ethylene copolymer resin adhesive layer 12a was composed of EEA resin ("DPDJ-8026", NIPPON UNICAR) and 3% of carbon black was blended thereinto, and its thickness was 20 μm. The ethylacrylate comonomer content of the EEA resin was 8%, and its melting point was 85° C. The total thickness of such a multilayer coextruded film 11a was accordingly 50 μm, and its tensile strength was 1530 g/15 mm width.

The configuration of the container II of the invention, was similar to that shown in FIG. 7. The ground fabric 1a was double raschel knitting structure, and its yarn was 50 deniers nylon yarn. The pile yarn was 75 deniers nylon yarn, and all piles were fluffed. The adhesive layer 10 was formed by coating vinyl acetate emulsion. The thermoplastic resin base layer 13a was composed of HDPE resin ("HIZEX 5300S", MITSUI PETROCHEMICAL INDUSTRIES) and 3% of carbon black blended thereinto, and its thickness was 30 μm. The melting point of the HDPE resin was 134° C., and its Young's modulus was 163 kg/mm². The ethylene copolymer resin adhesive layer 12a was composed of EEA resin ("DPDJ-6169", NIPPON UNICAR) and 3% of carbon black blended thereinto, and its thickness was 20 μm. The ethylacrylate comonomer content of the EEA resin was 18%, and its melting point was 67° C. The total thickness of the multilayer coextruded film 11a was 50 μm, and its tensile strength was 2250 g/15 mm width.

Figure 19:
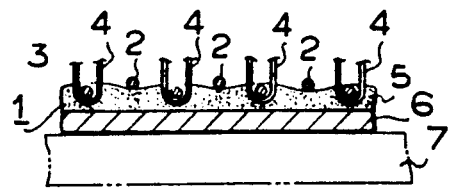
FIG. 19 is a schematically illustrated sectional view of a conventional teremp cloth stuck on a container body.
Figure 20:
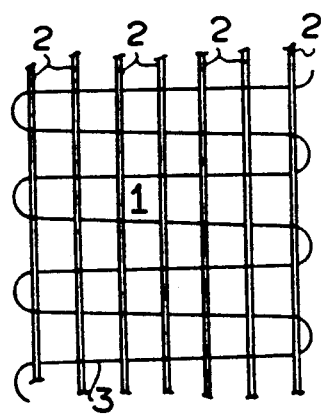
FIG. 20 is a schematic plan view illustrating a woven structure.

The configuration of the comparative container was similar to that shown in FIG. 19. The ground fabric 1 was tricot knitting structure, and its yarn was 50 deniers polyester yarn. The pile yarn was also 50 deniers polyester yarn, and the piles were composed of 30% of fluffed piles and 70% of looped piles. The filling layer 5 and the adhesive layer 6 were formed by solution coating.

The configuration of the conventional container was shown in FIG. 19. The ground fabric 1 was velvet weaving structure, and its yarn was 150 deniers rayon yarn. The pile yarn was 75 deniers rayon yarn, and the piles were all fluffed. The filling layer 5 and the adhesive layer 6 were formed by solution coating.

The results are shown in Table 2.

TABLE 2

|  | Invention 1 | Invention 2 | Comparative | Conventional | Test Method |
|---|---|---|---|---|---|
| Configuration | FIG. 7 | FIG. 7 | FIG. 19 | FIG. 19 | |
| Structure of Teremp Cloth | Tricot Knitting | Double Raschel Knitting | Tricot Knitting | Velvet Weaving | |
| Ground Fabric Yarn | 50 Deniers Polyester Yarn | 50 Deniers Nylon Yarn | 50 Deniers Polyester Yarn | 50 Deniers Rayon Yarn | |
| Pile Yarn | 50 Deniers Polyester Yarn | 75 Deniers Nylon Yarn | 50 Deniers Polyester Yarn | 75 Deniers Rayon Yarn | |
| Form Fluffed of Pile | 30% | 100% | 30% | 100% | |
| Looped | 70% | 0% | 70% | 0% | |
| Filling Layer | | | Solution Coating | Solution Coating | |
| Adhesive Layer | EEA | VA | Solution Coating | Solution Coating | |
| Thermoplastic Resin Base Layer | HDPE with CB | HDPE with CB | — | — | |
| Ethylene Copolymer Resin Adhesive Layer | EEA with CB | EEA with CB | — | — | |
| Fray at Cut Position | A | A | B | D | I |
| Falling out of Piles | A | A | B | D | I |
| Exudation of Filling Material | A | A | E | D | II |
| Softness | A | A | D | D-E | II |
| Cost Ratio | 22 | 27 | 31 | 100 | III |
| Evenness of Adhesive Layer | A | A | D | D | IV |
| Deformation of Ground Fabric | A | A | D | D | V |

Evaluations and testing methods are the same as described previously. The remaining testing methods are as follows.

IV: Evenness of each adhesive layer was judged by measuring a perpendicular cut face of this layer.

V: Deformation such as wrinkle, furrow and curl was judged by observation of the ground fabric after coating the adhesive layers.

I claim:

1. A container for a roll of a light-sensitive strip material having a core on which said light-sensitive strip material is coiled to form a roll, an opening for drawing out said light-sensitive strip material and a teremp cloth having a ground fabric provided on said opening for shielding from light, wherein a filling layer formed of polyolefin copolymer resin which is an ethylene-ethylacrylate resin having a comonomer content of more than 6% by weight usable as an adhesive layer for fixing said teremp cloth on the container is provided at the ground fabric of said teremp cloth.

2. The container of claim 1 wherein said teremp cloth is made of polyester fiber or polyamide fiber.

3. The container of claim 1 wherein said teremp cloth is a knitted fabric.

4. A container for a roll of a light-sensitive strip material having a core on which said light-sensitive strip material is coiled to form a roll, an opening for drawing out said light-sensitive strip material and a teremp cloth having a ground fabric provided on said opening for shielding from light, wherein a multilayer coextruded film is laminated under the ground fabric of said teremp cloth, and said multilayer coextruded film has a tensile strength of more than 500 g/15 mm width and comprises an adhesive layer of an ethylene copolymer resin having a comonomer content of 5 to 36% by weight for fixing said teremp cloth on the container and a thermoplastic resin base layer having a melting point of higher than said ethylene copolymer resin adhesive layer by 10° C. or more and a Young's modulus of more than 15 kg/mm².

5. The container of claim 4 wherein said ethylene copolymer resin is a member selected from EEA resin, EMA resin, EVA resin, EAA resin and EMAA resin.

6. The container of claim 4 wherein said ethylene copolymer resin adhesive layer contains 0.1 to 20% by weight of carbon black.

7. The container of claim 4 wherein said thermoplastic resin is selected from LDPE resin, L-LDPE resin, MDPE resin, HDPE resin, polypropylene resin and blended resins containing more than 50% by weight of the above polyethylene resin or polypropylene resin.

8. The container of claim 4 wherein, said ethylene copolymer resin is EEA resin, and said thermoplastic resin is HDPE resin.

9. The container of claim 4 wherein a filling layer formed of polyolefin resin usable as an adhesive layer is provided at the ground fabric of said teremp cloth.

* * * * *